US012187585B2

(12) United States Patent
Roodenburg et al.

(10) Patent No.: US 12,187,585 B2
(45) Date of Patent: Jan. 7, 2025

(54) CRANE VESSEL FOR HOISTING OF AN OFFSHORE WIND TURBINE OR COMPONENT THEREOF

(71) Applicant: ITREC B.V., Schiedam (NL)

(72) Inventors: David Roodenburg, Schiedam (NL); Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 212 days.

(21) Appl. No.: 17/909,665

(22) PCT Filed: Mar. 5, 2021

(86) PCT No.: PCT/EP2021/055623
§ 371 (c)(1),
(2) Date: Sep. 6, 2022

(87) PCT Pub. No.: WO2021/176071
PCT Pub. Date: Sep. 10, 2021

(65) Prior Publication Data
US 2023/0294963 A1 Sep. 21, 2023

(30) Foreign Application Priority Data
Mar. 6, 2020 (NL) .................................... 2025079

(51) Int. Cl.
*B66C 23/53* (2006.01)
*B63B 27/10* (2006.01)
(Continued)

(52) U.S. Cl.
CPC .............. *B66C 23/53* (2013.01); *B63B 27/10* (2013.01); *B63B 75/00* (2020.01); *B66C 23/185* (2013.01);
(Continued)

(58) Field of Classification Search
CPC ........ B66C 23/53; B66C 23/283; B66C 23/34
See application file for complete search history.

(56) References Cited

U.S. PATENT DOCUMENTS

2003/0213765 A1* 11/2003 St-Germain ............ B66B 7/027
212/294
2017/0008740 A1 1/2017 Hess et al.
2019/0248631 A1* 8/2019 Roodenburg ........... B66C 23/84

FOREIGN PATENT DOCUMENTS

DE     10 2016 109 004 A1    5/2017
JP         49-77668 U          7/1974
(Continued)

OTHER PUBLICATIONS

DE 102016109004 Machine Translation. (Year: 2017).*
(Continued)

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A crane vessel for hoisting of an offshore wind turbine or a component thereof, includes a hull having a deck. A crane configured for hoisting of an offshore wind turbine or a component thereof includes a vertical crane structure having a crane structure base fixed to the hull, the crane structure extending from the hull over a height thereof to a top along a vertical axis of the crane structure, a boom, and a slew bearing allowing to revolve the boom, about a slew axis. A main hoisting system includes at least one main hoisting winch, an associated main hoisting cable and a load connector, the main hoisting cable extending from the main hoisting winch to a main hoist cable guide on the boom and then to the load connector. The crane further includes a dynamic behaviour adjustment system that is configured to adjust the dynamic behaviour of the vessel by moving and/or (Continued)

arranging an adjustment mass that is distinct from the offshore wind turbine or component thereof into or in at least one dynamic behaviour adjustment position along the height of the vertical crane structure.

18 Claims, 11 Drawing Sheets

(51) Int. Cl.
    *B63B 75/00*     (2020.01)
    *B66C 23/18*     (2006.01)
    *B66C 23/88*     (2006.01)
    *F03D 13/10*     (2016.01)
    *B63B 35/44*     (2006.01)

(52) U.S. Cl.
    CPC .............. *B66C 23/88* (2013.01); *F03D 13/10* (2016.05); *B63B 2035/446* (2013.01)

(56) References Cited

FOREIGN PATENT DOCUMENTS

| | | |
|---|---|---|
| JP | 59-124798 U | 8/1984 |
| WO | WO 2010/006602 A2 | 1/2010 |
| WO | WO 2010/006602 A3 | 1/2010 |
| WO | WO 2018/106105 A1 | 6/2018 |
| WO | WO 2018/199743 A2 | 11/2018 |
| WO | WO 2018/199743 A3 | 11/2018 |

OTHER PUBLICATIONS

International Search Report for PCT/EP2021/055623 (PCT/ISA/210) mailed on Aug. 9, 2021.
Written Opinion of the International Searching Authority for PCT/EP2021/055623 (PCT/ISA/237) mailed on Aug. 9, 2021.

* cited by examiner

CRANE VESSEL FOR HOISTING OF AN OFFSHORE WIND TURBINE OR COMPONENT THEREOF

FIELD OF THE INVENTION

The present invention relates to the field of crane vessels for hoisting of an offshore wind turbine or a component thereof, e.g. in the installation of an offshore wind turbine or maintenance thereof.

BACKGROUND OF THE INVENTION

Generally, crane vessels employed for this field can be categorized into jack-up type crane vessels and floating type vessels. As commonly known, the jack-up type vessels have jack-up legs and associated jack-up mechanisms to lift the hull out of the water when use is to be made of the on-board crane for installation of an offshore wind turbine or maintenance thereof. In embodiments, the crane is a so-called around-the-leg crane. The other category has a non-jack-up type floating hull, so lacking jack-up legs and a related jack-up mechanism. It is envisaged that this crane vessel is used in floating condition, so subject to wave motion, etc.

An advantage of not using a jack-up crane vessel is that the time for jacking up and down can be dispensed with. Another, even more prominent issue, is the advent of wind turbines installed on a floating foundation, in particular in waters where the depth does not allow the use of jack-up vessels, or allows for their use only in floating condition. Also the seabed close to the foundation may not be suitable for supporting a jack-up vessel.

Clearly, wave motion affects the use of the crane when the crane vessel is in floating condition during the hoist job. This is in particular relevant when the crane is used at the offshore windfarm, instead of in a more shielded environment like a port or a fjord. Whilst heave motion can rather easily be compensated for, e.g. by using heave motion compensation in the main hoisting system, other vessel motions may pose a greater complication during the use of the crane for installation or maintenance of the wind turbine or component thereof.

When it comes to roll of the crane vessel, which is even present to some degree when the vessel is subject to head seas, some proposals seek to place the crane on a motion-stabilized platform. This appears to be an approach that may suit relatively small cranes, e.g. in view of maximum operating height and load handling capacity of a crane that can be placed on such platform. As offshore wind turbines have become, and are still becoming, taller and taller over the years, this approach may only suit a fraction of the demand. The more demanding job for these vessels require, as is known in the art, the use of a crane vessel having a hull that is in floating condition during the hoist job and having a crane configured for hoisting of an offshore wind turbine or a component thereof. Herein the crane comprises:
- a vertical crane structure having a crane structure base fixed to the hull, the crane structure extending from the hull over a height thereof to a top along a vertical axis of the crane structure,
- a boom,
- a slew bearing allowing to revolve the boom, preferably over 360 degrees, about a slew axis, preferably the slew axis coinciding with the vertical axis of the crane structure,
- a main hoisting system comprising at least one main hoisting winch, an associated main hoisting cable and a load connector, e.g. a hook, the main hoisting cable extending from the main hoisting winch to a main hoist cable guide on the boom and then to the load connector.

In the field, it is known to provide the crane vessel with a stabilizing system that is operable when the vessel is at standstill during a hoist job, e.g. to counter roll. Known systems are arranged within or to the outside of the hull, like stabilizing tanks, e.g. the well-known U-tanks, the use of a stabilizing pontoon that is temporarily secured to the outside of the hull, the provision of a solid ballast that is reciprocated over rails extending transverse to the axis of the vessel to compensate roll, etc.

OBJECT OF THE INVENTION

According to a first aspect thereof, the present invention aims to provide enhanced control of the dynamic behaviour of the vessel when hoisting of an offshore wind turbine or a component thereof, e.g. in the installation of an offshore wind turbine or maintenance thereof.

SUMMARY OF THE INVENTION

According to the first aspect of the invention, a crane vessel according to claim 1 is provided, wherein the crane further comprises a dynamic behaviour adjustment system that is configured to adjust the dynamic behaviour, e.g. roll behaviour, e.g. roll period, of the vessel by moving and/or arranging an adjustment mass that is distinct from the offshore wind turbine or component thereof into or in at least one dynamic behaviour adjustment position along the height of the vertical crane structure.

In an embodiment, the vertical crane structure extends at least 50 meters or more above the deck of the vessel. In embodiments, at least one dynamic behaviour adjustment position is at least 25 meters above the deck, e.g. in proximity to the top of the vertical crane structure. Therefore, in general, the mass can be effective at a significant height above the deck.

In practical use, when transiting with the vessel, the adjustment mass can be parked in a lower or lowermost position thereof or be otherwise removed from the adjustment position, e.g. by emptying a chamber or container of the adjustment mass.

For example, the adjustment mass can travel vertically over at least 30% of the height of the vertical crane structure, e.g. at least 50%, possibly over about the entire height of the vertical crane structure. Possibly, the adjustment mass has a lowermost position at the level of the deck, or even below deck. Possibly, the adjustment mass has an uppermost position in proximity of the top of the crane structure.

The weight of the adjustment mass will in practical terms be significant in order to obtain the beneficial effect. Of course, the design of the hull and the crane will influence the practical design of the inventive system. Suitable dimensioning and operation can, for instance, be determined, at least roughly, on wave tank testing of a model of the crane vessel, e.g. in combination with a model of a floating foundation, e.g. including modelling of the installation of the wind turbine or component thereof.

In an embodiment, the vessel is equipped with one or more sensors that monitor parameters indicative of the actual dynamic behaviour of the vessel, e.g. including roll motion and/or pitch motion, heave, change of waterline, etc., and the use of the inventive system involves operating the system, possibly in combination with one or more stabilizing systems, so that the monitored parameter meets a predetermined value or range, e.g. determined in view of the hoist job to be performed, and/or meets or resembles a corresponding parameter simultaneously monitored for the floating foundation on which the turbine or component is to be installed. For example, the inventive system may assist the stabilizing system(s) active during the hoist job.

In an embodiment, the inventive system comprises a computerized controller that is linked to one or more sensors that monitor one or more parameters indicative of the actual dynamic behaviour of the vessel, e.g. including roll motion and/or pitch motion and/or position of the wind turbine or component thereof, e.g. in the transfer to the foundation, and that on the basis thereof controls the system, e.g. adjusts the position of the adjustment mass along the height of the vertical crane structure and/or adjusts the weight of the mass, e.g. by pumping water as explained herein.

From the prior art perspective of seeking to stabilize the vessel, and thus the vertical crane structure fixed to the hull, the provision of the inventive adjustment system adds a significant mass that is not required for the crane to perform its task and operation of this system causes the center of gravity of the vessel to be higher up than in absence of the additional mass in the at least one dynamic behaviour adjustment position along the height of the vertical crane structure. In practical circumstances, however, this may be beneficial in view of the task to be performed. For example, when installing a nacelle on top of a mast that has been placed already on a soil-bound foundation, the system may be employed to deliberately push the GM down and the wave periods higher up, reducing vessel motions due to wave motions.

The inventive system may be of benefit when crane is used for installation of a wind turbine or component thereof on a floating foundation or on part of the wind turbine already present or installed on this foundation, like the nacelle on a mast fixed to the foundation. The foundation will then also be subject to induced motions, e.g. roll, and the system may then be employed in view of (partly) synchronizing the behaviour or motion of the vessel to the behaviour or motion of the foundation.

In an embodiment, use is made of one or more sensors that monitor parameters indicative of the actual dynamic behaviour of the floating foundation, e.g. including roll motion and/or pitch motion and/or change in waterline, advantageously while simultaneously using one or more further sensors that monitor parameters indicative of the actual dynamic behaviour of the crane vessel, the data acquired being fed to a computerized controller that on the basis thereof controls the system, e.g. adjusts the position of the adjustment mass along the height of the vertical crane structure and/or adjusts the weight of the mass, e.g. by pumping water as explained herein.

The inventive system may be of benefit during the moment of transfer of the weight of the wind turbine or component thereof from the crane to the foundation. This affects the dynamic behaviour of the vessel, when present also of the floating foundation, and the system may allow for compensation effects when desired, e.g. the mass being moved vertically in the period of such transfer, e.g. just prior, during, and/or after the transfer.

In an embodiment, monitoring one or more actual parameters may be accompanied by a predictive control of the inventive system, e.g. radar technology being employed to determine incoming waves in the distance and the system taking that into account.

In an embodiment, monitoring one or more actual parameters may be used in the context of a control model of the system, wherein the control model is based on computer analysis ad/o wave tank testing.

In an embodiment, the dynamic behaviour adjustment system comprises a vertically mobile adjustment mass that is vertically mobile along the vertical crane structure, e.g. inside the crane structure or outside the vertical crane structure, and an associated mobile adjustment mass support system, the mobile mass support system being configured to raise or lower the adjustment mass along the crane structure, and to fix, for a while, the adjustment mass in at least one dynamic behaviour adjustment position, preferably in at least one of multiple positions at different heights, to thereby change the dynamic behaviour, e.g. the roll behaviour, of the vessel.

In a simple form, the adjustment mass can be moved upwards to offset, at least in part, the change of the height of the overall center of gravity as the entire wind turbine is lowered by the crane towards the foundation, so that dynamic behaviour of the vessel remains unaffected, or less affected, than in absence of the inventive system. This may, for example, facilitate landing the wind turbine on the foundation, e.g. the floating foundation.

In an embodiment, the at least one dynamic behaviour adjustment position is in an upper halve of the vertical crane structure, preferably near or at the top thereof.

In an embodiment, the mobile adjustment mass system comprises a guide fixed to the vertical crane structure, e.g. inside the vertical crane structure or to the exterior of the vertical crane structure, e.g. from the level of the deck to a height in proximity of the top, for guiding the mobile adjustment mass when being moved into the at least one dynamic behaviour adjustment position.

In an embodiment, the mobile adjustment mass is modular, e.g. composed of solid mass elements, and the mass of the mobile mass can be reduced or increased depending on the adjustment required.

In an embodiment, the adjustment mass comprises a volume chamber at a fixed dynamic behaviour adjustment position or a vertically mobile volume chamber that is vertically movable relative to the vertical crane structure, and a pump to fill the volume chamber with liquid, e.g. water.

In an embodiment, the vertical crane structure is composed of a crane structure base that is fixed to the hull and a crane structure top section that is supported on the crane structure base via the slew bearing and forms the top, wherein the boom is mounted to the crane structure top section so as to revolve along with the crane structure top section. Preferably, the top section is formed by a lattice structured framework, e.g. in view of weight, wind, etc.

In an embodiment, the vertically mobile adjustment mass is vertically mobile inside the crane structure top section, e.g. the latticework defining a vertical path there through for the vertically mobile adjustment mass. In an embodiment, the adjustment mass has a range of vertical travel that extends over a major portion of the height of the top section, e.g. over at least 50% thereof, e.g. about the entire height. In an embodiment, the adjustment mass has a lowermost position, wherein the mass rests on the base section of the crane, e.g. inn proximity of the slew bearing location. In an embodiment, the base section is configured to lower the adjustment mass to the level of the deck.

In an embodiment, the vertically mobile adjustment mass is suspended from, e.g. within, the crane structure top section, e.g. from the top thereof. For instance, the mass is suspended from one or more winch driven cables, wherein the one or more associated winches are mounted on the top section.

In an embodiment, e.g. in combination with a slewable top section, the boom is connected to the top of the vertical crane structure, preferably pivotally connected for pivoting of the boom about a horizontal pivot axis by means of a luffing mechanism. Herein, the pivoting of the boom allows to vary the reach of the crane.

In an embodiment, the crane is a mast crane, where the vertical crane structure is embodied in its entirety as a hollow mast with a closed outer wall. Herein, a revolving crane superstructure is mounted via a slew bearing on the mast at a fixed height, and the boom is pivotally connected to the superstructure for pivoting about a horizontal pivot axis. A luffing mechanism extends between the top of the mast and the crane boom, as is known in the art.

In another embodiment, the crane is a tower crane, e.g. as described herein in more detail with reference to the second aspect of the invention, wherein the tower crane has a crane tower, optionally a modular crane tower, having a tower base mounted to the hull and a tower top, the tower crane further comprising a crane unit, the crane unit comprising:
- a crane base mounted to the top of, or vertically guided on, the crane tower,
- a revolving crane superstructure,
- a boom, which boom, preferably, is pivotally connected to the superstructure for pivoting about a horizontal pivot axis,
- a slew bearing, rotatable supporting the crane superstructure on the crane base and thus on the tower so that the crane unit can revolve, preferably over 360 degrees about a vertical slew axis, preferably slew axis coinciding with the vertical axis of the crane tower.

The first aspect of the invention also relates to a method for hoisting of an offshore wind turbine or a component thereof, e.g. in the installation of an offshore wind turbine or maintenance thereof, wherein use is made of a crane vessel comprising:
- a hull, e.g. a non-jack-up type floating hull, the hull having a deck;
- a crane configured for hoisting of an offshore wind turbine or a component thereof and comprising:
  - a vertical crane structure having a crane structure base fixed to the hull, the crane structure extending from the hull over a height thereof to a top along a vertical axis of the crane structure,
  - a boom,
  - a slew bearing allowing to revolve the boom, preferably over 360 degrees, about a slew axis, preferably the slew axis coinciding with the vertical axis of the crane structure,
  - a main hoisting system comprising at least one main hoisting winch, an associated main hoisting cable and a load connector, e.g. a hook, the main hoisting cable extending from the main hoisting winch to a main hoist cable guide on the boom and then to the load connector, wherein the crane further comprises a dynamic behaviour adjustment system that is configured and operated to adjust the dynamic behaviour, e.g. roll behaviour, e.g. roll period, of the vessel by moving and/or arranging an adjustment mass that is distinct from the offshore wind turbine or component thereof into or in at least one dynamic behaviour adjustment position along the height of the vertical crane structure.

In an embodiment, wherein the vessel comprises a tower crane, the tower crane having a crane tower and a crane unit, preferably a tower crane according to the second aspect of the invention, the method comprises:
- lifting a mobile adjustment mass into the crane tower,
- support the mobile adjustment mass at a predetermined height in, e.g. inside or outside, the tower in at least one dynamic behaviour adjustment position, e.g. to adjust the roll of the vessel for carrying out the hoist job.

In an embodiment, the method comprises:
- determining the roll behaviour adjustment position, taking into consideration the roll behaviour of the vessel, the weight of the mobile adjustment mass, and preferably the weight of the load to be lifted with the crane;
- moving the mobile adjustment mass into the determined roll behaviour adjustment position.

According to a second aspect thereof, the invention relates to a crane vessel for hoisting of an offshore wind turbine or component thereof, e.g. in the installation of an offshore wind turbine or maintenance thereof, the vessel comprising:
- a hull, e.g. a non-jack-up type floating hull, the hull having a deck;
- a tower crane, the tower crane comprising:
  - a crane tower, optionally a modular crane tower, having a tower base mounted to the hull and a tower top, and
  - a crane unit, the crane unit comprising:
    - a revolving crane superstructure,
    - a boom, which boom is pivotally connected to the superstructure for pivoting about a horizontal pivot axis,
    - a slew bearing, rotatable supporting the crane superstructure on the crane tower.

As discussed herein, the tower crane may be equipped with the dynamic behaviour adjustment system according to the first aspect of the invention.

In an embodiment, the crane tower extends at least 50 meters or more above the deck of the vessel. In an embodiment, the crane tower is a cylinder, having a circumferential wall enclosing an interior space. In an alternative embodiment, the crane tower may comprise a truss or frame. In such an embodiment, the interior of the crane tower is open to the environment. In an embodiment, the crane tower may comprise section shaping an enclosed interior space and sections having an interior space open to the environment.

In an embodiment, the tower crane comprises a nacelle balcony, supported by the tower, which balcony is configured for supporting the nacelle at a height above the deck, wherein the height allows for fixing one or more blades to the nacelle supported by the balcony. Preferably, the height is such that the nacelle can be supported above the deck with all its blades attached. Thus, the completed nacelle can be lifted from the nacelle balcony onto a wind turbine pedestal, or vice versa. Thus, the nacelle can be lifted on board without the blades having to be removed, i.e. detached, from the nacelle. Also, when blades have to be detached from or attached to the nacelle, this can be done with the nacelle supported on the same vessel as the crane supporting the blades. When the nacelle is supported on a seafloor based pedestal, e.g. a jacket or pylon secured in the seafloor, and the blade is positioned using a crane on a floating vessel, movement of the vessel relative to the pedestal may complicate the procedure.

In an embodiment, the crane tower is a modular tower, and is composed out of multiple, preferably 10 or more, stackable tower sections for building or extending the crane tower, and the tower crane comprises a lifting device for lifting the modular sections, which lifting device, preferably, is supported by the upper most modular section of the tower crane.

In an embodiment, the modular tower is configured such that it can support the crane at different heights, e.g. by stacking a certain number of tower sections. In an embodiment, the tower sections may be identical to each other, enabling a random stacking of the tower sections. In another embodiment, one or more tower sections may be provided that are to be stacked in a particular sequence. For example, the tower crane may comprises a dedicated base tower section and a dedicated top tower section, to be placed at the base and at the top of the tower respectively, and multiple modular tower sections that can be stacked between the base tower section and the top tower section.

A modular tower allows for the crane tower to be erected when needed for a particular job, and to be lowered, i.e. disassembled, after the job is done. Thus, the vessel may travel from one job location to another job location with the tower disassembled. The reduced height makes the vessel less susceptible to wind and allows for the vessel to travel below low bridges. Also, providing a modular tower allows for adjusting the height of the crane tower to fit a particular job.

In an embodiment, the tower crane comprises a stacking sleeve, configured for stacking a crane tower section on top of another crane tower section, and for lifting the crane over a height of at least one crane tower section.

In an embodiment, the tower crane is an around-the-leg climbing tower crane, wherein the slew bearing has a central crane tower passage through which crane tower passage the crane tower extends. In this embodiment, the crane comprises a crane unit lifting device, configured for lifting the crane unit up and down the crane tower.

In an embodiment, the crane unit lifting device comprises multiple hydraulic cylinders, that are at one end connected with the crane superstructure and are at an opposite end provided with tower engagement devices, for example engagement devices configured to engage apertures provided in the crane tower to lift the crane unit a certain distance along the tower. The hydraulic cylinders can thus be used to lift or lower the crane superstructure from one intermediate support position to another, and thus along the crane tower. In an alternative embodiment, the around-the-leg climbing tower crane is provided with a hoisting winch comprising a hoisting wire that is with one end to be connected at the top of the crane tower, such that the hoisting winch can be used to lift the crane unit towards the top of the crane tower and lower the crane unit from an elevated position on the crane tower towards the deck of the vessel.

In an embodiment, the tower crane further comprises a dynamic behaviour adjustment system, as discussed herein, e.g. allowing to adjust the roll behaviour of the vessel, e.g. in dependence of a load to be lifted with the crane. The adjustment system comprises a mobile adjustment mass and a mobile adjustment mass support system. The mobile mass support system is configured to support the mobile mass at a predetermined height in, e.g. inside or outside, the tower in at least one dynamic behaviour adjustment position.

In an embodiment, the mobile adjustment mass support system is configured to move the mobile mass in a vertical direction, i.e. to raise or lower the mass along the tower, and to fix the mobile mass in the tower in at least one dynamic behaviour adjustment position, to thus change the dynamic behaviour, e.g. the roll, of the vessel.

In an embodiment, the at least one dynamic behaviour adjustment position is in the upper halve of the crane tower, more preferably is near or at the top of the tower.

In an embodiment, the mobile adjustment mass support system is configured to support the mobile mass at different heights in the crane tower.

In an embodiment, the crane tower is a modular tower, and is composed out of multiple stackable tower sections for building or extending the crane tower, and the dynamic behaviour adjustment system is incorporated in one or more tower sections.

In an embodiment, the mobile adjustment mass support system comprises a hoist for lifting and lowering the mobile adjustment mass alongside, e.g. inside or outside, the crane tower.

In an embodiment, the mobile adjustment mass system comprises a guide fixed to the crane tower, for guiding the mobile adjustment mass when being moved into the at least one dynamic behaviour adjustment position.

In an embodiment, the mobile adjustment mass is modular, and the mass of the mobile mass can be reduced or increased depending on the adjustment required.

In an embodiment, the mobile adjustment mass comprises a volume chamber fixed or to be fixed in the tower, and a pump to fill the volume chamber with liquid, e.g. water.

A third aspect of the invention, e.g. to be combined with the first and/or second aspect of the invention, provides a roll damping system for use in a crane of a crane vessel, e.g. in a vertical crane structure, e.g. in the crane tower of the crane, for example a crane as discussed above, to dampen the roll behaviour of the vessel.

The roll damping system, e.g. located in the upper half of the vertical crane structure, preferably located at or near a top of the vertical crane structure, comprises a tuned mass damper, e.g. a pendulum mass and at least one pendulum mass damper.

In an embodiment, the tuned mass damper, e.g. the pendulum mass thereof, is supported inside the vertical crane structure, for example is suspended from one or more pendulum wires such that the pendulum mass can swing inside the vertical crane structure. In an alternative embodiment, the pendulum mass is supported outside the vertical crane structure, for example is annular shaped and extends around the vertical crane structure, supported by multiple pendulum wires, e.g. fixed at or near the top of the vertical crane structure.

In an embodiment, the roll damping system is a module, which module can be lifted into and out of the crane tower. In such an embodiment, the module is, for example, configured to be lifted on top of the crane tower. Such an embodiment allows for mounting the module on top of the tower when needed and stored on the deck between jobs.

In an embodiment, the pendulum mass is modular, and the mass of the pendulum mass can be reduced or increased depending on the adjustment required.

In an embodiment, the pendulum mass is supported by an pendulum member having an adjustable length, and the pendulum mass can be supported at different heights to change the dynamic behaviour of the pendulum.

In an embodiment, the at least one pendulum mass damper is an adjustable damper, e.g. is a cylinder that allows for setting the damping performance.

In an embodiment, the roll damping system comprises a hoist for lifting and lowering the pendulum mass into and out of the vertical crane structure, independent of the at least one pendulum mass damper.

The invention furthermore provides a method for damping the roll of a crane vessel, e.g. wherein the vessel comprises a tower crane, the tower crane having a crane tower and a crane, preferably a tower crane according to the invention. The method comprises the use of a tuned mass damper, e.g. damping the movement of a pendulum mass, which pendulum mass is supported near or at the crane tower of the tower crane.

In an embodiment, the method further comprising adjusting the dynamic behaviour of the pendulum mass, preferably taking into consideration the roll behaviour of the vessel, the weight of the pendulum mass, and preferably the weight of the load to be lifted with the crane, by adjusting the weight of the pendulum mass and/or by adjusting the damping force and/or by adjusting the length of the pendulum.

According to a fourth aspect thereof, the invention furthermore provides a crane vessel for hoisting of an offshore wind turbine or component thereof, e.g. in the installation of an offshore wind turbine or maintenance thereof, the vessel comprising:
 a hull, the hull having a deck;
 a crane,
 a nacelle support tower or other auxiliary tower distinct from the crane and extending above the deck, e.g. embodied in the manner as described herein for the tower crane,
wherein the nacelle support tower is supported by the hull of the vessel, within a reach of the crane, and is configured for supporting a nacelle of a wind turbine, and
wherein the nacelle support tower or other auxiliary tower comprises a dynamic behaviour adjustment system as disclosed herein for adjusting the dynamic behaviour of the vessel and/or with a roll damping system as disclosed herein for damping the roll of the vessel.

In an embodiment, the fourth aspect of the invention envisages, amongst others to provide an existing crane vessel with an auxiliary tower equipped with a dynamic behaviour adjustment system as disclosed herein for adjusting the dynamic behaviour of the vessel and/or with a roll damping system as disclosed herein for damping the roll of the vessel. The tower may have this or these functionalities as its sole purpose.

In the context of, for example, the fourth aspect the hull may be a non-jack-up type floating hull, e.g. a semi-submersible. However, the dynamic behaviour adjustment system as disclosed herein for adjusting the dynamic behaviour of the vessel and/or the roll damping system as disclosed herein for damping the roll of the vessel may also be of interest when the crane on-board of a jack-up vessel, e.g. an around-the-leg crane, is used when the vessel is in floating condition instead of being jacked-up. In an embodiment, a jack-up leg of the vessel, or even multiple jack-up legs, which then can extend as an auxiliary tower above the deck may be equipped with the dynamic behaviour adjustment system as disclosed herein for adjusting the dynamic behaviour of the vessel and/or the roll damping system as disclosed herein for damping the roll of the vessel.

The present invention also relates to a method for hoisting of an offshore wind turbine or a component thereof, e.g. in the installation of an offshore wind turbine or maintenance thereof, wherein use is made of a crane vessel as described herein. For example, the hoisting may involve lifting the turbine or component thereof from a feeder vessel, e.g. for assembly of the wind turbine to be completed on-board the crane vessel prior to installation of the assembled wind turbine in its entirety on a foundation.

Whilst primarily presented for illustrative purposes with reference to one or more of the figures, any of the technical features addressed herein may be combined with any of the claims of this application either alone or in any other technically possible combination with one or more other technical features.

Advantageous embodiments of the crane and the crane vessels according to the invention and the methods according to the invention are disclosed in the subclaims and in the description, in which the invention is further illustrated and elucidated on the basis of a number of exemplary embodiments, of which some are shown in the schematic drawing.

BRIEF DESCRIPTION OF THE DRAWINGS

The invention will now be discussed with reference to the drawings. In the drawings.

DETAILED DESCRIPTION OF EMBODIMENTS

Figure 1:
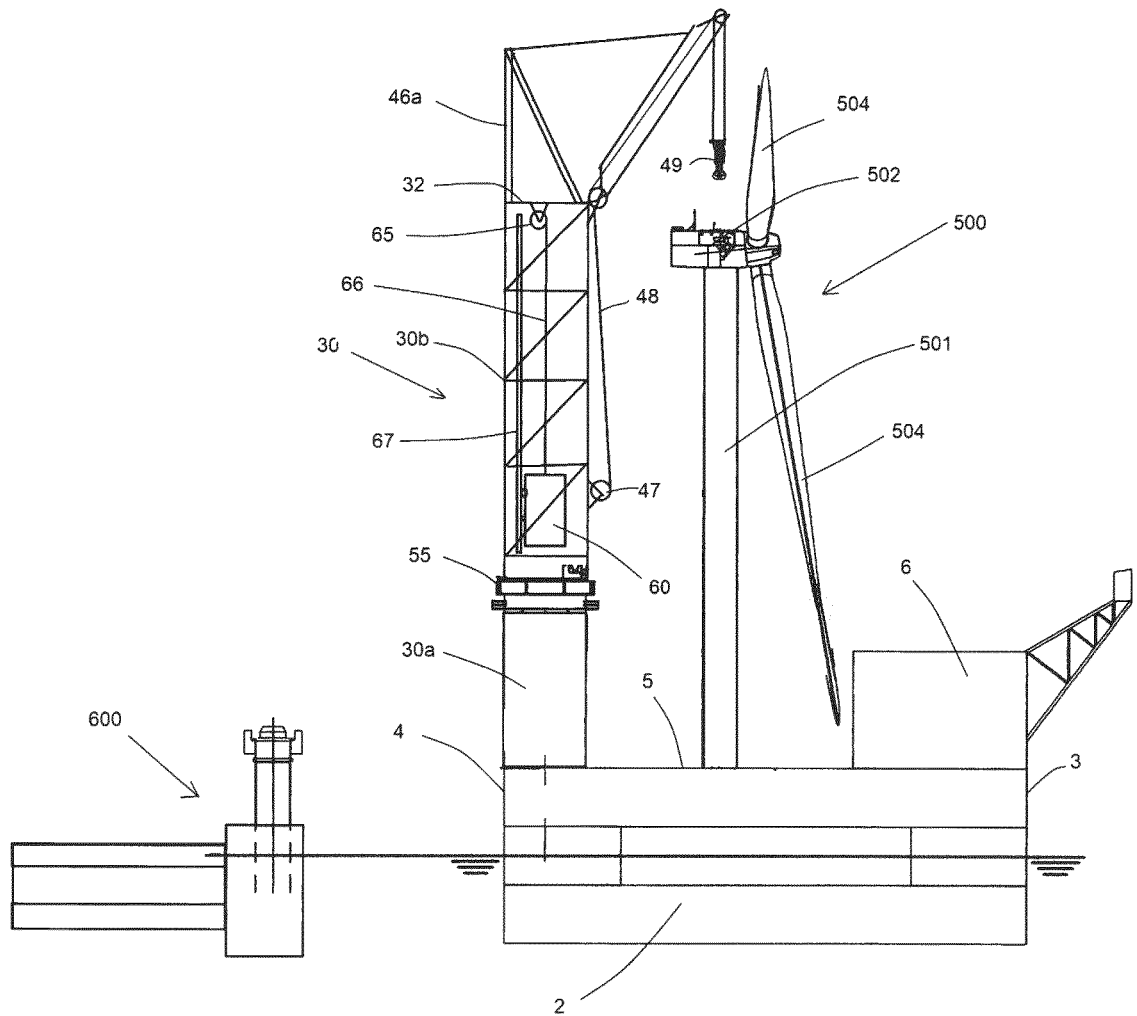
FIG. 1 shows an example of a crane vessel according to the invention prior to lifting the entire offshore wind turbine from the vessel and with the dynamic behaviour adjustment mass in a lower position thereof, as well as a foundation on which the wind turbine is to be installed.
Figure 2:
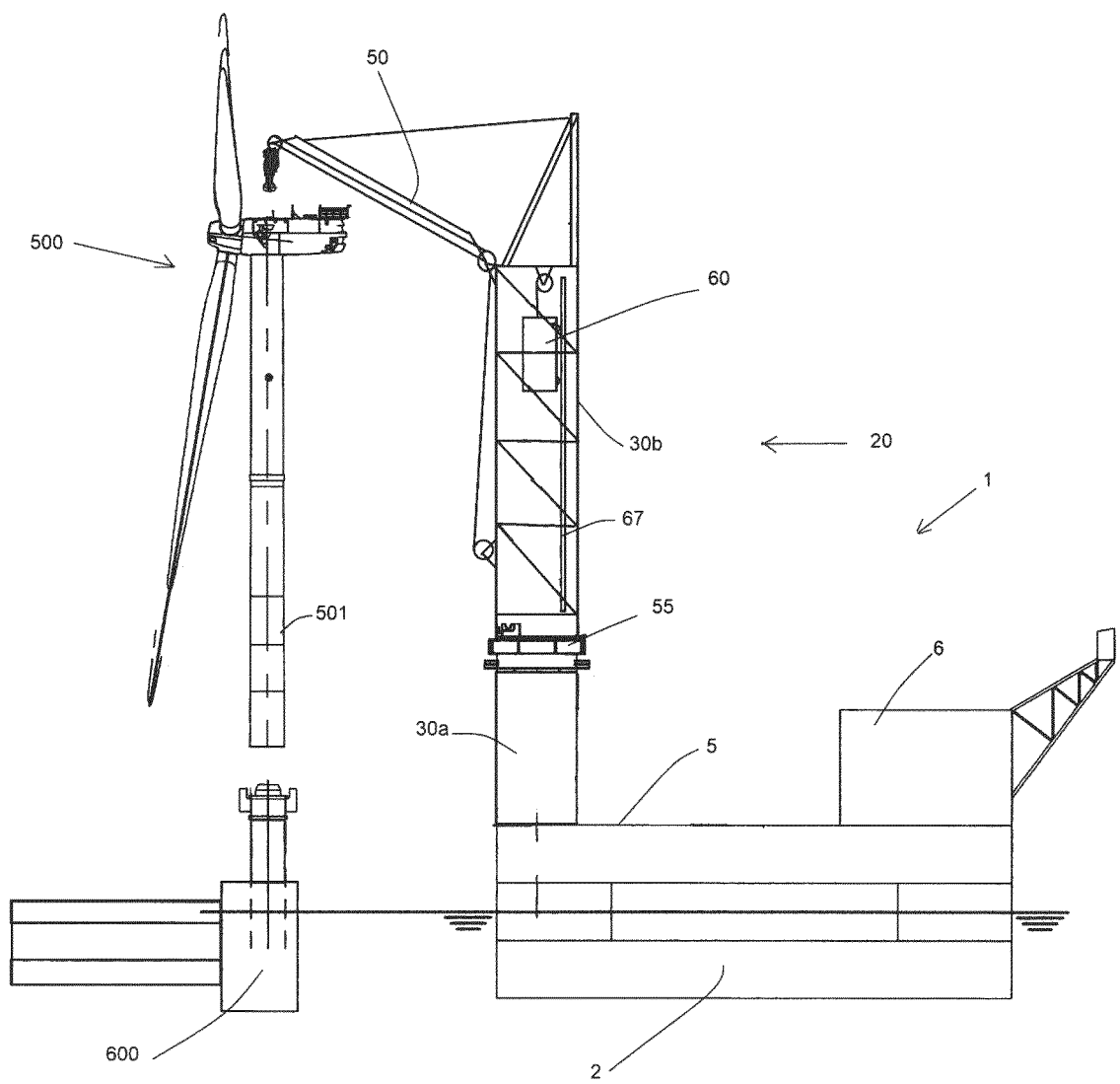
FIG. 2 shows the vessel of FIG. 1 with the wind turbine suspended from the crane having been moved by slewing the top section and brought into a position above the foundation, and with the mass in a raised dynamic behaviour adjustment lower position thereof.
Figure 3:
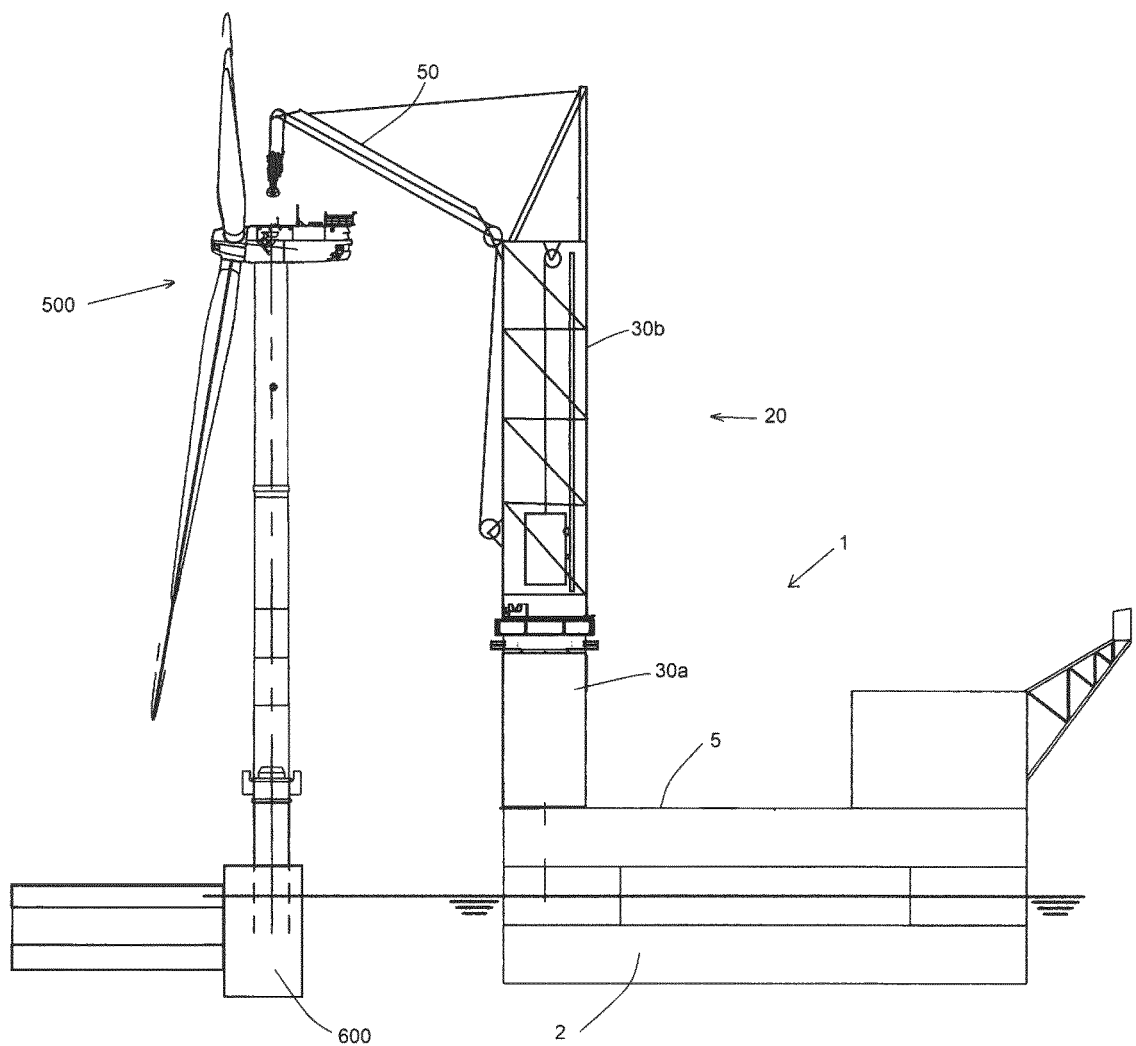
FIG. 3 shows the vessel of FIG. 1 with the wind turbine lowered onto the foundation.

With reference to FIGS. 1-3, an example of a crane vessel 1 provided with the dynamic behaviour adjustment mass system according to the invention will be discussed.

The vessel 1 is a semi-submersible type vessel having a hull 2, with a bow 3 and a stern 4.

The crane vessel 1 is in floating condition, so subject to wave motion, current, wind, etc., when the crane 20 thereof is used for installation and/or maintenance of an offshore wind turbine or component thereof.

In embodiments, as shown, the hull 2 has parallel pontoons and vertical columns thereon that support a deck box structure, wherein the deck box structure is provided with the deck 5.

A bridge and crew accommodation 6 is erected at the bow 3. Aft thereof, the hull has a deck that, as preferred, extends to the stern 4. Other arrangements are also possible, e.g. the accommodation being integrated in the crane 20.

The crane 20 of the vessel is configured for handling an entire offshore wind turbine 500 that is to be installed on a foundation, here a floating foundation 600 of which a part is schematically shown. The foundation 600 can, for example, already be moored at its location in an offshore windfarm prior to installation of the turbine thereon. Different types of floating foundations, including tension leg foundations, spars, etc. are known in the art.

For example, the floating foundation 600 and the vessel 1 are interconnected for performing the installation of the turbine, e.g. using mooring line or another restraining mechanism, e.g. restraining the foundation in the horizontal plane relative to the vessel.

The wind turbine 500 is of the type with a vertical mast 501 to be fitted with its lower end onto the foundation, and with a nacelle 502, wherein the electric generator is housed, and with a hub, 503 and blades 504 fitted on the hub. The assembly of nacelle, hub, and blades is supported on top of the mast 501.

It is envisaged, that assembly of the wind turbine 500 is done on-board the vessel. For example, the crane 20 is used to upend the mast 501 from a horizontal position in vertical position, and/or to fit the nacelle 502 on the mast 501, and/or to fit the blades 504 to the hub. Herein different assembly steps can be performed at distinct stations on-board the vessel within reach of the crane 20, e.g. at different stations reached by slewing a top section of the crane.

Generally, the crane 20 is configured and used to lift the assembled wind turbine off the vessel by suspending the wind turbine from the crane. Then, by slewing a top section of the crane, the turbine 500 is brought into a position above the foundation 600. The crane is then operated to lower the mast of the turbine 500 onto the foundation, where the mast is secured to the foundation.

The crane 20 has a vertical crane structure 30 that is composed of a crane structure base 30*a* that is fixed to the hull 2 and a crane structure top section 30*b* that is supported on the crane structure base via the slew bearing 55 and forms the top 32.

An open frame, here embodied as gantry 46*a*, is arranged on the top 32.

A boom 50 is mounted to the crane structure top section 30*b*, here at the top 32, so as to revolve along with the crane structure top section 30*b* when slewing.

The boom 50 is pivotally connected to the slewable top section 30*b* for pivoting of the boom about a horizontal pivot axis by means of a variable length luffing mechanism 57. Herein, the pivoting or luffing of the boom allows to vary the reach of the crane 20.

The top section 30*b* is formed by a lattice structured framework, e.g. in view of weight, wind, etc. The base section 30*a* is embodied as a housing having closed outer walls welded to the hull, e.g. square or rectangular at the level of the deck 5 and circular at the slew bearing 55 . . . .

The crane 20 has a main hoisting system comprising at least one main hoisting winch 47 and an associated main hoisting cable 48 and a load connector 49, e.g. a hook, the cable 48 extends from the main hoisting winch to a main hoist cable guide on a boom head structure.

The vertical crane structure 30 extends at least 50 meters or more above the deck 5 of the vessel, e.g. over 80 meters, e.g. over 110 meters, in view of the size of high capacity offshore wind turbines.

In order to provide enhanced control of the dynamic behaviour of the vessel 1 when hoisting of an offshore wind turbine 500 or a component thereof, e.g. in the installation of an offshore wind turbine or maintenance thereof, the crane further comprises a dynamic behaviour adjustment system that is configured to adjust the dynamic behaviour, e.g. roll behaviour, e.g. roll period, of the vessel 1 by moving and/or arranging an adjustment mass 60 that is distinct from the offshore wind turbine or component thereof into or in at least one dynamic behaviour adjustment position along the height of the vertical crane structure.

In embodiments, at least one dynamic behaviour adjustment position is at least 25 meters above the deck 5, more preferably in proximity of the top 32 of the vertical crane structure 30. So, in general, the mass 60 can be effective at a significant height above the deck 5, thereby changing the dynamic behaviour of the vessel, e.g. the roll thereof. The system may also change pitch motion of the vessel 1, which may also, or even more, be of importance depending on the actual task, e.g. dependent on where the foundation is located relative to the hull of the vessel when the wind turbine or component thereof is installed.

In practical use, when transiting with the vessel 1, the adjustment mass 65 can be parked in a lower position thereof.

The weight of the adjustment mass 60 will in practical terms be significant in order to obtain the beneficial effect. Of course, the design of the hull 2 and the crane 20 will influence the practical design of the inventive system.

In an embodiment, the vessel 1 is equipped with one or more sensors that monitor parameters indicative of the actual dynamic behaviour of the vessel, e.g. including roll motion and/or pitch motion, and the use of the inventive system involves operating the system, possibly in combination with one or more stabilizing systems, so that the monitored parameter meets a predetermined value or range, e.g. determined in view of the hoist job to be performed, and/or meets or resembles a corresponding parameter simultaneously monitored for the floating foundation on which the turbine or component is to be installed. For example, the inventive system may assist the stabilizing system(s).

In an embodiment, the inventive system comprises a computerized controller that is linked to one or more sensors that monitor parameters indicative of the actual dynamic behaviour of the vessel 1, e.g. including roll motion and/or pitch motion, and that on the basis thereof controls the system, e.g. adjusts the position of the adjustment mass 60 along the height of the crane structure 30 and/or adjusts the weight of the mass 60, e.g. by pumping water as explained herein.

From the prior art perspective of seeking to stabilize the vessel, and thus the vertical crane structure fixed to the hull, the provision of such adjustment system adds a significant mass that is not required for the crane to perform its task and operation of this system causes the center of gravity of the vessel to be higher up than in absence of the additional mass in the at least one dynamic behaviour adjustment position along the height of the vertical crane structure. In practical circumstances, however, this may be beneficial in view of the task to be performed.

The inventive system may be of benefit when crane 20 is used for installation of a wind turbine or component thereof on a floating foundation 600 or on part of the wind turbine already present or installed on this foundation, like the nacelle on a mast fixed to the foundation. The foundation 600 will then also be subject to induced motions, e.g. roll, and the system may then be employed in view of (partly) synchronizing the behaviour or motion of the vessel to the behaviour or motion of the foundation.

The inventive system may be of benefit during the moment of transfer of the weight of the wind turbine 500 or component thereof from the crane 20 to the foundation 600. This affects the dynamic behaviour of the vessel, as well as of the floating foundation 600, and the system may allow for compensation effects when desired.

The adjustment mass 60 here is vertically mobile along and inside of the vertical crane structure 30, here the top section 30b thereof. An associated mobile adjustment mass support system, here winch 65 and winch driven cable 66 allow to raise and lower the adjustment mass along the crane structure, and to fix the adjustment mass in at least one dynamic behaviour adjustment position, preferably in at least one of multiple positions at different heights, to thereby change the dynamic behaviour, e.g. the roll behaviour, of the vessel 1.

In an embodiment, the at least one dynamic behaviour adjustment position is in an upper halve of the vertical crane structure, preferably near or at the top thereof.

Here the mobile adjustment mass system comprises a guide 67, e.g. one or more vertical rails, that are fixed to the vertical crane structure, e.g. inside the top section 30b of the vertical crane structure, for guiding the mobile adjustment mass 60, e.g. having rollers or shoes cooperating with the rails, when being moved into the at least one dynamic behaviour adjustment position. In another embodiment, the guide 67 is fixed to the outside of the top section, e.g. diametrically opposed from the boom 50, so that the mass 60 is moved along the exterior of the top section 30b.

In an embodiment, the mobile adjustment mass 60 is modular, e.g. composed of solid mass elements, and the mass of the mobile mass can be reduced or increased depending on the adjustment required.

In an embodiment, the adjustment mass 60 comprises a volume chamber at a fixed dynamic behaviour adjustment position or a vertically mobile volume chamber that is vertically movable relative to the vertical crane structure, and a pump to fill the volume chamber with liquid, e.g. water.

In an embodiment, the vertically mobile adjustment mass is vertically mobile inside the crane structure top section, e.g. the latticework defining a vertical path there through for the vertically mobile adjustment mass.

In an embodiment, the vertically mobile adjustment mass is suspended from, e.g. within, the crane structure top section, e.g. from the top thereof. For instance, the mass is suspended from one or more winch driven cables, wherein the one or more associated winches are mounted on the top section.

With reference to FIGS. 4-11 other embodiments of a crane vessel for hoisting of an offshore wind turbine component, e.g. in the installation of an offshore wind turbine or maintenance thereof will be discussed.

Figure 4:
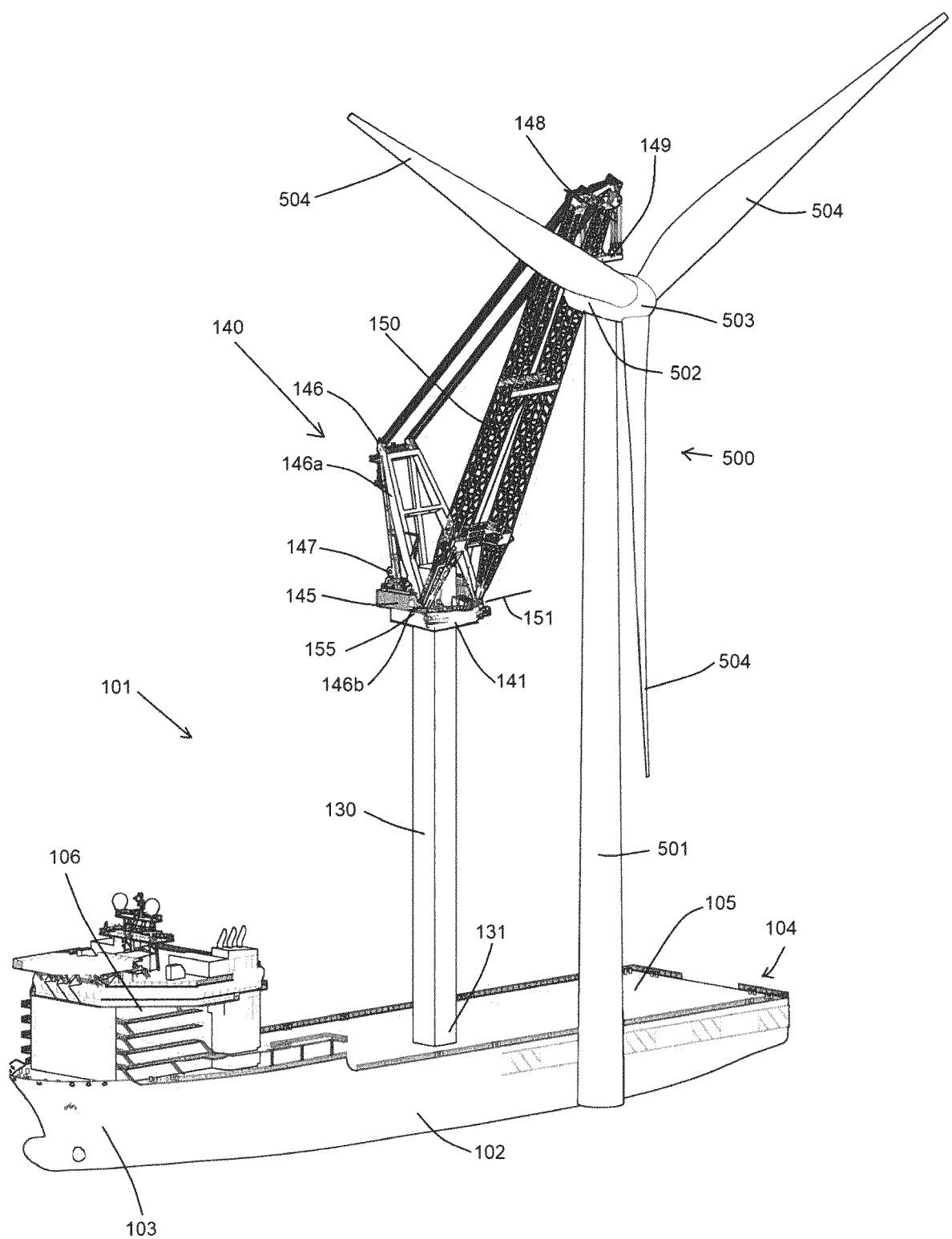
FIG. 4 shows another example of a crane vessel according to the invention with the crane in raised position relative to the crane tower.

The FIG. 4 shows an offshore wind turbine 500 that is mounted on a foundation that has been installed on the seabed prior to the installation of the wind turbine on the foundation. For example, the foundation is embodied as a jacket with a structural framework, the jacket having piling guides through which piles can extend to fasten the jacket to the seabed. Other embodiments of foundations, e.g. a monopile or a gravity base, or a floating foundation, are also possible.

For example, the crane of the vessel 100 is used to fit the blades 504 to the hub, or to fit an assembly of hub and blades to the nacelle, or to fit the entire assembly of nacelle, hub, and blades on top of the mast 501. One could also, for example, use the crane of the vessel 100 to remove and exchange a defect component from an already installed offshore wind turbine, e.g. a blade, a gearbox, a generator, etc.

The vessel 100 has a hull 102, which is embodied in this example as a non-jack-up type floating hull, so lacking jack-up legs and a related jack-up mechanism. It is envisaged that the crane vessel 1 is used in floating condition, so subject to wave motion, etc.

The hull 102 here is a monohull having a bow 103 and a stern 104.

A bridge and crew accommodation 106 is erected at the bow 103. Aft thereof, the hull has a deck 105 that, as preferred, extends to the stern 104.

Other designs of the hull are also envisaged, e.g. a semi-submersible, e.g. having parallel pontoons and vertical columns thereon that support deck box structure, wherein the deck box structure is provided with the deck.

It is noted, that in a possible embodiment, the vessel 100 may be equipped with jack-up legs and associated jack-up mechanisms, the inventive measures, e.g., allowing for enhanced operation, e.g. allowing for operations without the legs being placed on the seabed and the hull being, at least partially, lifted from the water.

As is preferred, the crane vessel has a self-propelled floating hull, for example with one or more dedicated propellers at the stern for sailing with the vessel and multiple thrusters allowing for dynamic positioning, although the use of anchors for positioning the vessel is also an additional or alternative option.

The vessel 101 is provided with a tower crane 120.

The tower crane 120 comprises:
 a crane tower 130, optionally a modular crane tower, having a tower base 131 fixedly mounted to the hull and a tower top 132,
 a crane unit 140, the crane unit 140 comprising:
  a crane base 141 mounted to, or preferably vertically guided on, the crane tower 130,
  a revolving crane superstructure 145,
  a boom 150, that is pivotally connected to the superstructure for pivoting about a horizontal pivot axis 151,
  a slew bearing 155, rotatable supporting the crane superstructure 145 on the crane base 141 and thus on the tower 130 so that the crane 140 can revolve, preferably over 360 degrees about a vertical axis, preferably said central axis coinciding with the vertical axis of the crane tower.

As illustrated here, in an embodiment, the crane tower 130 extends at least 50 meters or more above the deck 105 of the vessel 101.

In a possible embodiment, as preferred, the crane tower is embodied as a singular vertical column.

For example, the crane tower is embodied as a hollow singular vertical column, having a central vertical passage therein extending over a majority, or all, of the height of the crane tower.

For example, the crane tower 130 is embodied as a latticework structured tower, e.g. with vertical chords at corners of the tower and bracing in horizontal and/or diagonal direction between the chords.

For example, the crane tower 130 is embodied similar to a jack-up leg of a jack-up type vessel.

For example, the crane tower 130 is embodied with a closed peripheral wall, e.g. as a hollow tube.

The crane tower 130 may have a rectangular, square, polygonal (e.g. octagonal), round, or oval cross-section.

In an embodiment, the crane tower 130 has a constant horizontal cross-section over its height. In another embodiment the crane tower 130 tapers in upward direction.

For example, the superstructure 145 is provided with:
a top cable guide 146 at a top thereof; and
a boom connection member 146b, e.g. comprising a left-hand connector and a right-hand hand connector at a mutual distance of each other, together defining the horizontal pivot axis 151.

For example, as shown here, the superstructure 145 comprises an open frame, also known as gantry 146a on which the guide 146 is arranged.

For example, the boom 150 is a fixed length boom. In another example, the boom is a telescopic boom.

For example, the boom 150 has a fixed or maximum telescoped length between 20 and 80 meters.

For example, the boom 150 has a left-hand boom leg and a right-hand boom leg, e.g. wherein the boom has an inner end connected to the left-hand connector and right-hand connector of the boom connection member so that the boom can be pivoted up and down about the horizontal pivot axis which is perpendicular to the longitudinal axis of a boom.

The boom 150 may have a boom head structure provided at a tip end of the boom.

The crane unit 140 has a luffing device for pivoting the boom up and down, here comprising a luffing winch and a variable length luffing system; the variable length luffing system extending from the luffing winch via a top cable guide 146 to the boom head structure at the tip end of the boom.

The crane unit 140 has a main hoisting system comprising at least one main hoisting winch 147 and an associated main hoisting cable 148 and a load connector 149, e.g. a hook, the cable 148 extends from the main hoisting winch to a main hoist cable guide on the boom head structure.

For example, the boom 150, e.g. the two boom legs thereof, comprises a hollow box structure with a top and bottom face and an outer and an inner side face.

In an embodiment, the crane unit 140 is a movable up and down along the crane tower 130, e.g. the crane is a climbing crane that is provided with a climbing mechanism 142, e.g. climbing step-by-step, allowing the crane unit 140 to move. For example, the climbing mechanism is provided on the crane base 141. Another type of crane lifting device could also be provided for, e.g. the crane being suspended from one or more winch driven cables, wherein operation of the one or more associated crane lifting winches allow for motion of the crane unit 140 up and down along the tower 130.

Figure 5:
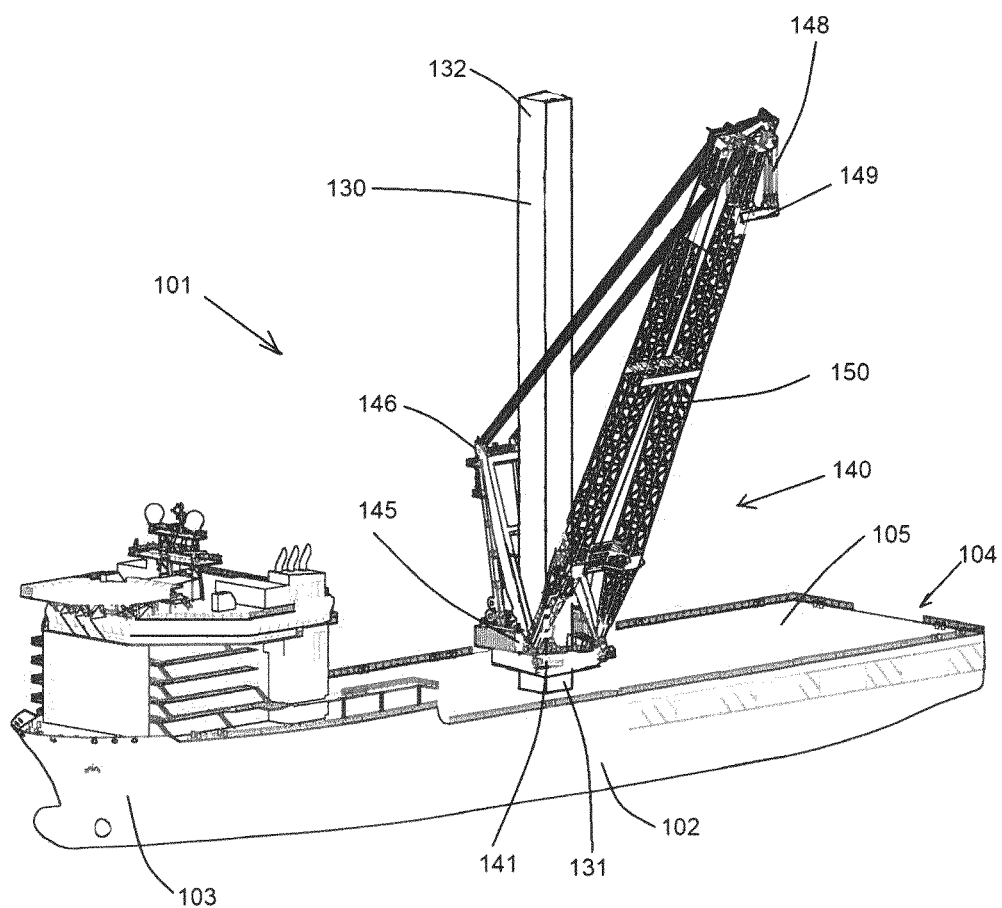
FIG. 5 shows the vessel of FIG. 4 with the crane in lowered position relative to the crane tower.

FIG. 5 shows an embodiment, wherein the crane unit 140 is movable up and down along the crane tower 130, e.g. as a climbing crane. The crane unit 140 is now in a lowered position thereof relative to the tower 130, e.g. in proximity of or resting on the deck 105 of the vessel.

For example, the crane unit 140 is lowered relative to the erect tower 130 when sailing with the vessel 101 and is moved to the top of the tower 130 for performing a hoisting job with the crane unit 140.

FIG. 5 illustrates that the crane unit 140 is not only movable up and down along the crane tower 130, e.g. between a position close to or at the deck of the vessel and a raised position at the top of the tower 130, but is an around-the-leg climbing crane unit 140. Herein the slew bearing 155 has a central crane tower passage 156 therein through which the crane tower 130 extends. This allows, for example, for lowering the crane unit 140 whilst the tower 130 remains at a certain height.

In an embodiment, the crane tower 130 is a modular tower composed out of multiple stackable tower sections, e.g. to be bolted to one another, for building or extending the crane tower.

Figure 6:
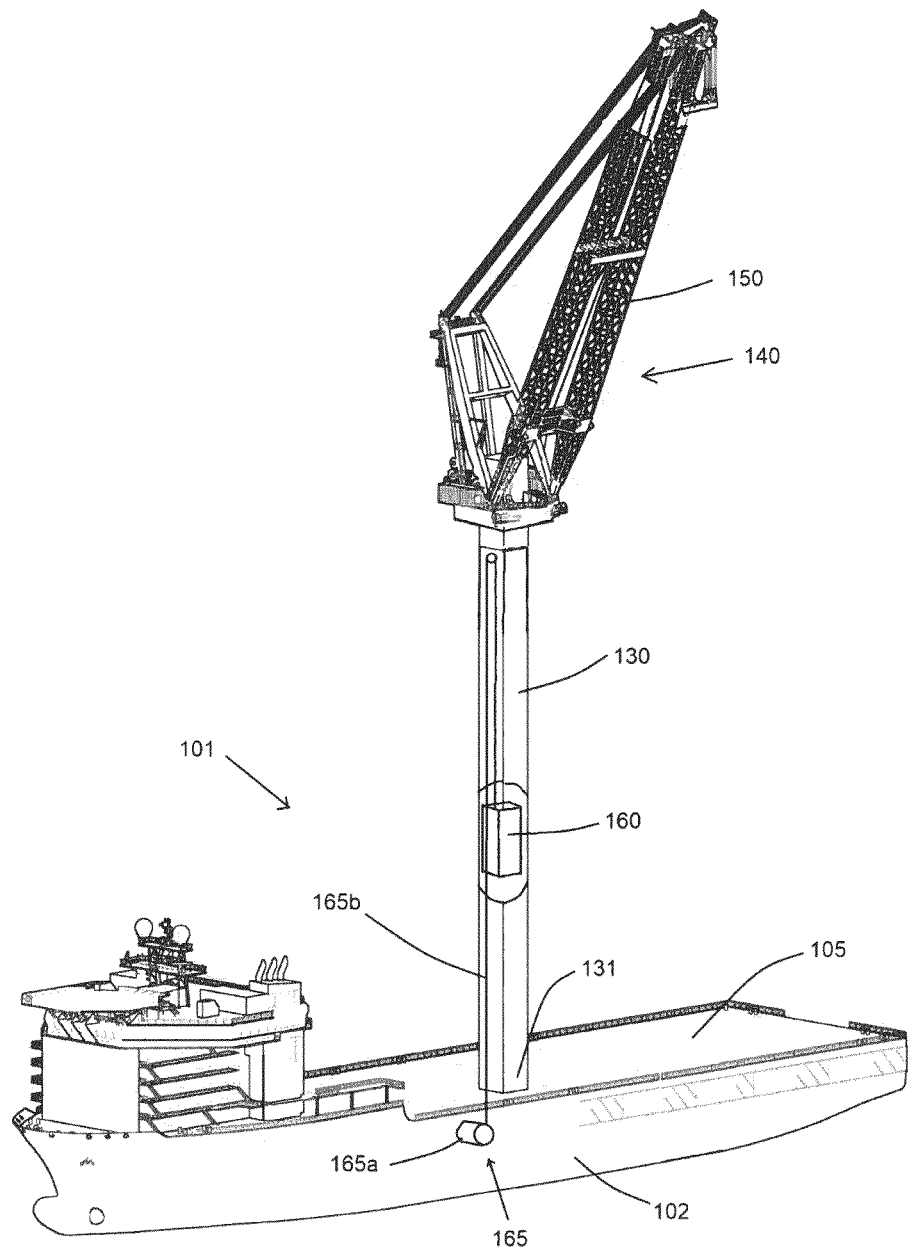
FIG. 6 shows the vessel of FIG. 4 with a roll behaviour adjustment system comprising a mobile adjustment mass and a mobile adjustment mass support system associated with the crane tower.

FIG. 6 illustrates the provision of a dynamic behaviour adjustment system, e.g. used to adjust roll behaviour when performing the installation of the wind turbine or component thereof, comprising a mobile adjustment mass 160 and a mobile adjustment mass support system 165 that is associated with the crane tower 130.

It is illustrated, as an embodiment, that the mass 160 is movable up and down relative to the crane tower 130, e.g. the mass 160 moving within the crane tower 130. In another embodiment, the mass 160 is arranged on the outside of the crane tower, e.g. an annular mass.

It is illustrated, as an embodiment, that the system 165 comprises a winch 165a and a winch driven cable 165b from which the mass 160 is suspended.

For example, the mass 160 is adjustable as to the actual weight thereof. For example, the mass 160 is embodied as a container that is fillable with a substance, e.g. water, sand, rocks, steel grit, etc.

For example, the mass 160 is composed of multiple mass elements, e.g. steel elements, the number of elements being selectable to adjust the mass as to its weight.

For example, one or more guide members are provided between the mass 160 and the tower 130 allowing for guidance of the mass whilst it is moved up or down along the tower. For example, the mass is provided with one or more guide wheels, e.g. cooperating with one or more vertical guide rails on the tower.

As explained herein, roll behaviour of the vessel 101 can be adjusted by means of the mass 160 and the associated system 165 in order to enhance performing a hoisting job using the crane 140 with the vessel 101 in floating condition.

The embodiment discussed with relation to FIG. 6 is just one option of a roll behaviour adjustment system, that is configured enable the crane 140 to be operated in a standard configuration, in which the roll behaviour of the vessel is not adjusted, and in a roll adjusted configuration, in which the roll behaviour of the vessel is adjusted e.g. in dependence of a load to be lifted with the crane, the height of the lift job, the reach of the lift job, the sea-state, etc.

Figure 7:
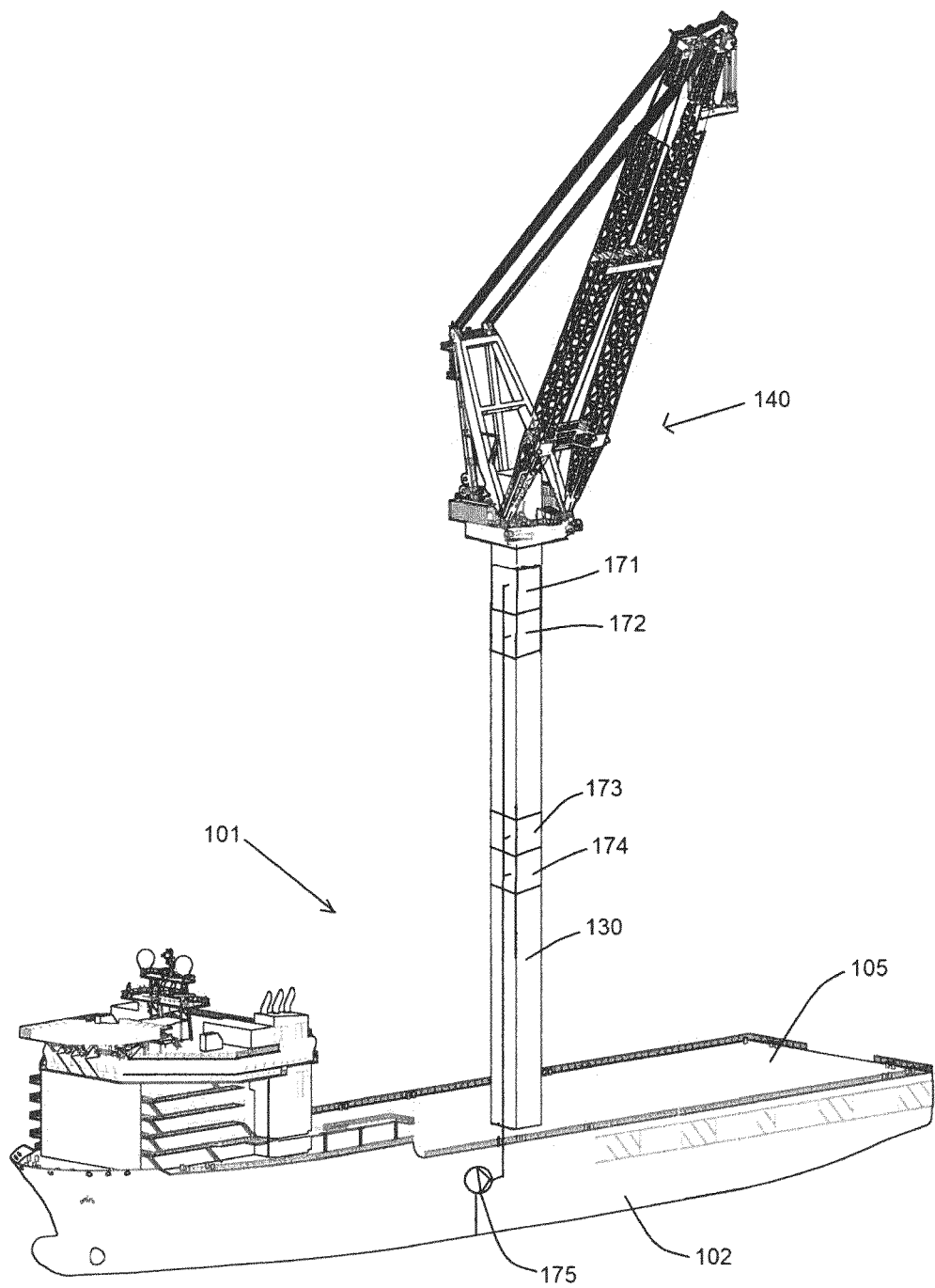
FIG. 7 shows the vessel of FIG. 4 with a roll behaviour adjustment system comprising volume chambers fixed in the crane tower, and a pump to fill the volume chambers with liquid, e.g. water.

FIG. 7 shows the vessel of FIG. 4 with another roll behaviour adjustment system comprising volume chambers 170, 171, 172, 173 at distinct height in or on the crane tower 130. A pump 175 is provided to fill the volume chambers with a liquid, e.g. water, e.g. seawater. This arrangement allow to set the actual mass as well as the relative height with respect to the hull 102 of this mass.

Figure 8:
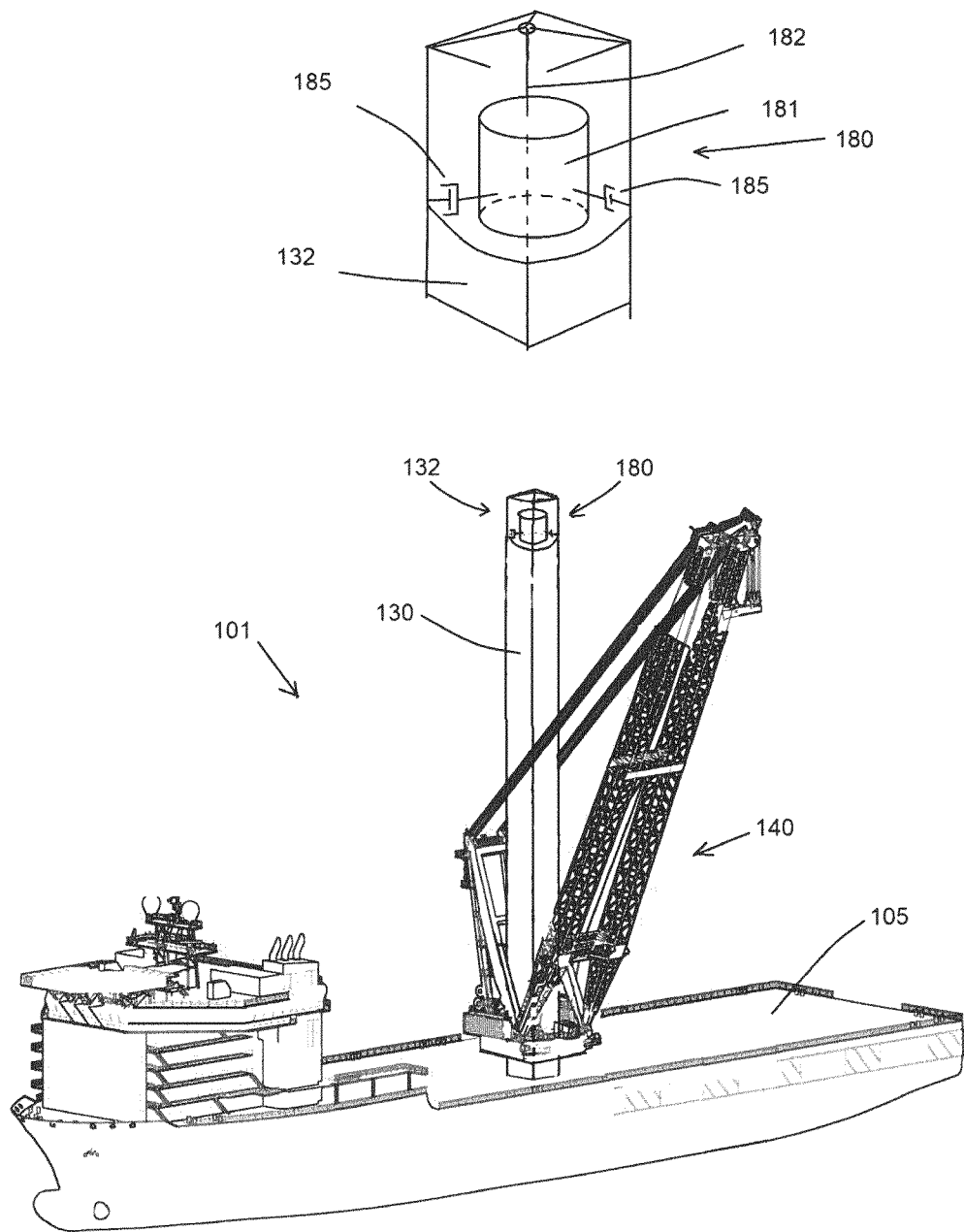
FIG. 8 shows the vessel of FIG. 4 with a roll damping system, located in proximity of the top of the crane tower, comprises a pendulum mass and at least one pendulum mass damper.

FIG. 8 shows the vessel 101 of FIG. 4 with a roll damping system 180, located in proximity of the top 132 of the crane tower 130. This system 180 comprises a pendulum mass 181 and at least one pendulum mass damper 185. For example, the mass 181 is suspended from one or more suspension cables 182 relative to the tower 130, preferably to the top of the tower. The mass 181 can move as a pendulum, here within the tower 130, here in all horizontal directions. For example, the mass 181 has a constant weight, in another embodiment the weight of the mass 181 is adjustable, e.g. embodied as a container to be filled with a substance or embodied with multiple mass elements of which a selected number composes the mass 181 that is actually used.

The dampers 185 could be passive dampers, or could be active, controllable, dampers. For example, the dampers are embodied as hydraulic cylinders.

FIG. 8 illustrates, as preferred, that the system 180 is arranged in proximity of the top 132.

In an embodiment, the mass 181 or even the mass 181 and the damper arrangement with one or more dampers 185, is movable relative to the crane tower, e.g. similar to what is shown in FIG. 7.

Figure 9:
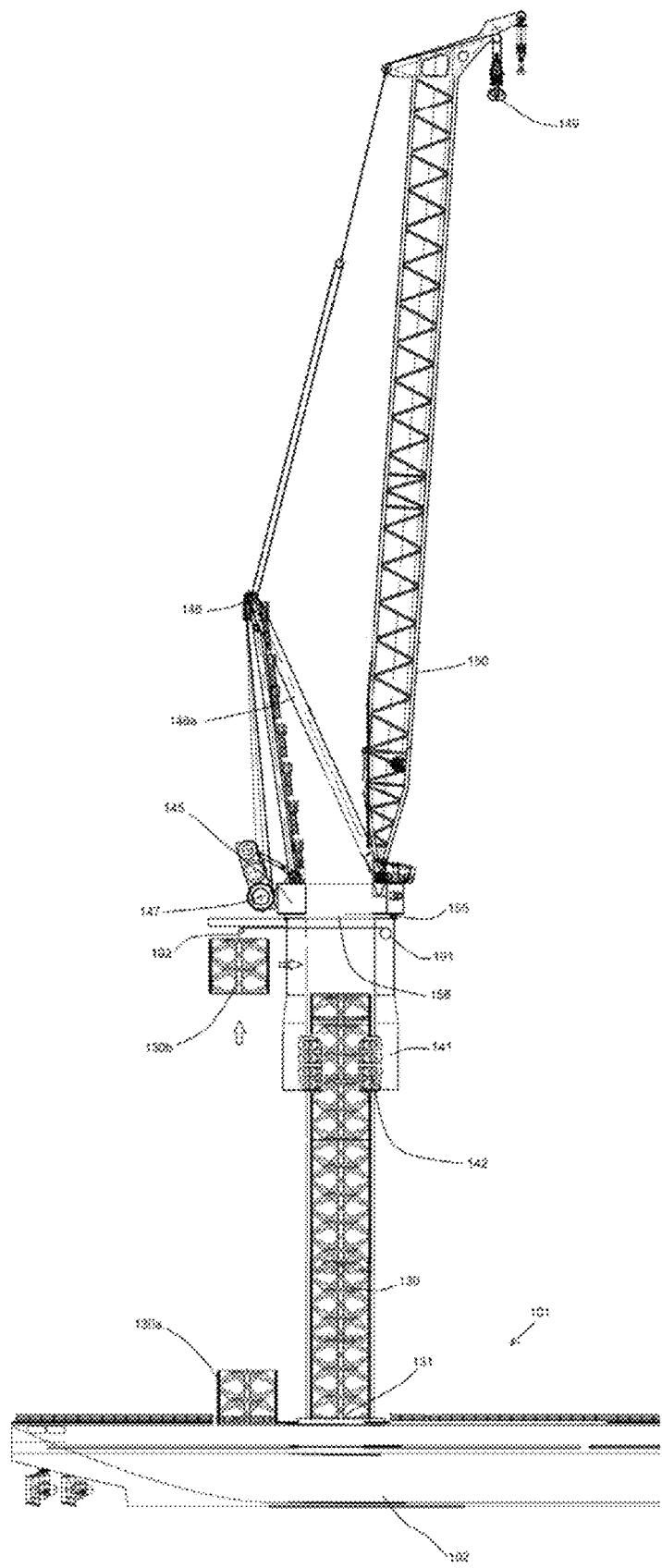
FIG. 9 shows the vessel of FIG. 4 wherein the crane tower is a modular crane tower and wherein the crane is configured to assemble the crane tower whilst climbing along the tower.

FIG. 9 shows the vessel of FIG. 4 wherein the crane tower 130 is a modular crane tower and wherein the crane unit 140 is configured to assemble the crane tower whilst climbing along the tower. This is generally known for onshore tower cranes used in particular in the building industry.

FIG. 9 shows that the crane unit 140 has a stacking sleeve as the base 141 of the unit that is configured for stacking a crane tower section 130a, b on top of the already assembled part of the crane tower. Herein, the crane unit 140 is moved upwards by a climbing mechanism, e.g. including hydraulic cylinders that engage on the already assembled part of the crane tower, so that space is created for a new section 130a,b. This new section 130a,b is lifted, e.g. from the deck 105, by means of tower section lift device 190 of the crane 140, here with winch 191 and cable 192, to the height of the tower top. Once lifted, the section 130a, b is moved laterally to a position aligned with the tower, so to within the base 141. Then the new section 130a, b is coupled to the tower. The crane unit 140 can then be moved up another step, for this routine to be repeated until the crane tower 130 reaches its desired height. Disassembly is done in reverse order.

As preferred, and as shown, the crane unit 140 is an over-the-tower crane unit, so lowering of the crane unit 140 is possible without the need for disassembly of the tower 130. This allows for faster lowering, e.g. of benefit when weather becomes adverse and quick lowering of the crane 140 is desired. The tower 130 can then remain, e.g. as shown in FIG. 6, and once the weather has improved the crane unit 140 can be moved up again along the tower 130.

Figure 10:
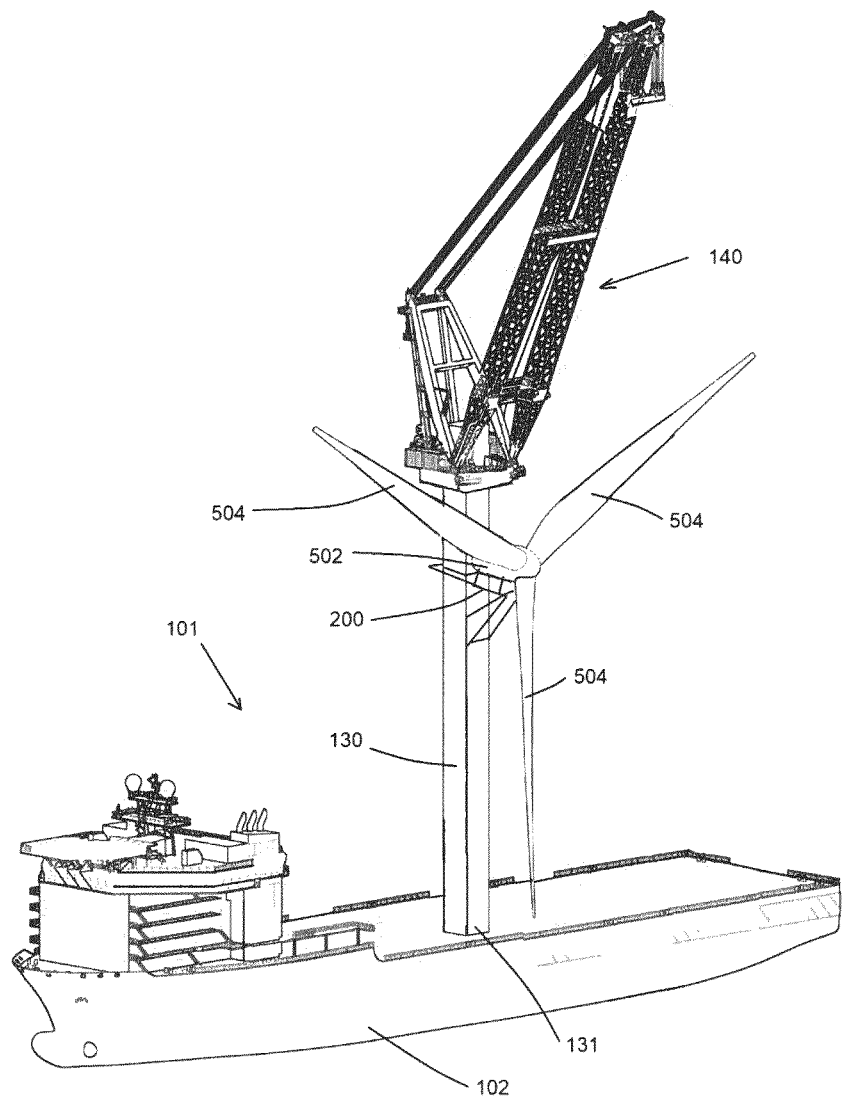
FIG. 10 shows the vessel of FIG. 4 wherein a nacelle balcony is supported by the crane tower.

FIG. 10 shows the vessel of FIG. 4 wherein a nacelle balcony 200 is supported by the crane tower 130 below the crane unit 140.

The balcony is configured for supporting the nacelle 502 and the hub 503, or may be just the hub 503, at a height above the deck 105. The height is such that it allows for fixing one or more blades 504 to the hub 503, whilst the nacelle 502 is supported by the balcony 200. Fixing of the blades 504 is done using the crane unit 140 supported on the same tower 130 in this example.

For example, as preferred, the balcony 200 is configured to be releasably mounted to the tower 130, e.g. in view of the need to have the balcony removed for moving the crane unit 140 up and down along the tower 130 as described herein.

For example, the balcony is configured to support a positioning member configured to position the inner or root end of a blade 504 relative to the hub 503 to enhance the process of fixing the blade 503.

For example, the balcony 200 is embodied such that the hub 503 is rotatable about its axis, e.g. allowing for fixing each blade to the hub in horizontal or vertical position of the blade.

Once the fixing of the blades 504 is completed, it is envisaged that the crane unit 140 is used to lift the assembly, so for example the entire nacelle, hub, and blades onto the top of the mast 501 of the wind turbine 500. In another embodiment, just the hub and blades fixed thereto is lifted by the crane and connected to a nacelle already present on the top of the mast.

Figure 11:
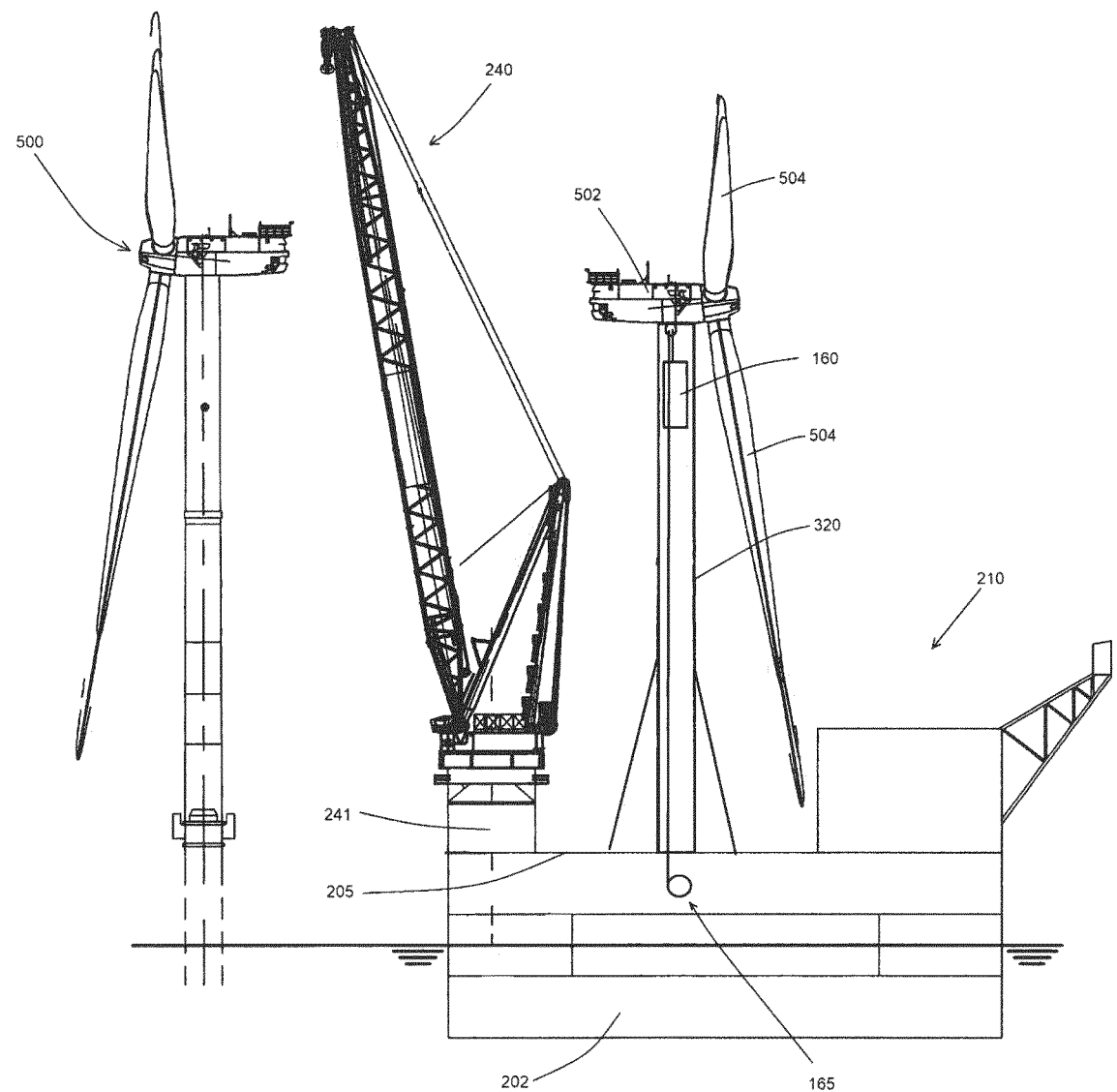
FIG. 11 shows another crane vessel for hoisting of an offshore wind turbine component wherein the vessel is provided with a nacelle supporting tower distinct from the crane of the vessel.

FIG. 11 shows yet another crane vessel 210 for hoisting of an offshore wind turbine component. This vessel 210 has, by way of example only, a hull embodied as a semi-submersible.

The vessel has a crane 240 that has, in this example, its base 241 fixed to the deck 205 of the hull 202 wherein the vessel is provided with a nacelle supporting tower 320 that is not associated with from the crane 240 of the vessel.

The tower 320 is configured for supporting the nacelle 502 and the hub 503, or may be just the hub 503, at a height above the deck 205. The height is such that it allows for fixing one or more blades 504 to the hub 503, whilst the nacelle 502 is supported by the tower 120. Fixing of the blades 504 is done using the crane 240.

Once the fixing of the blades 504 is completed, it is envisaged that the crane 240 is used to lift the assembly, so for example the entire nacelle, hub, and blades onto the top of the mast 501 of the wind turbine 500. In another embodiment, just the hub and blades fixed thereto is lifted by the crane and connected to a nacelle already present on the top of the mast.

As the tower 320 may have substantial height above the hull 202, here above the deck 205, e.g. of at least 30 meters, e.g. at least 50 meters, above the deck, it is—in embodiments—envisaged to provide the tower 320 with a roll behaviour adjustment system and/or roll damping system as described herein.

For example, as shown, a mass 160 and associated system 165, are provided on the tower 320. Or, or possibly also, the system 180 with mobile mass 181 and damper(s) 185 are provided on the tower 320.

The tower 320 can be modular, e.g. allowing for disassembly when not in use and/or adjustment of the actual height of the tower 320, e.g. depending on the size of the wind turbine.

The invention claimed is:

1. A crane vessel for hoisting of an offshore wind turbine or a component thereof, the vessel comprising:
   a hull having a deck; and
   a crane configured for hoisting of an offshore wind turbine or a component thereof and comprising:
      a vertical crane structure having a crane structure base fixed to the hull, the crane structure extending from the hull over a height thereof to a top along a vertical axis of the crane structure;
      a boom;
      a slew bearing allowing to revolve the boom about a slew axis;
      a main hoisting system comprising at least one main hoisting winch, an associated main hoisting cable and a load connector, the main hoisting cable extending from the main hoisting winch to a main hoist cable guide on the boom and then to the load connector; and
   a dynamic behaviour adjustment system that is configured to adjust the dynamic behaviour of the vessel by moving and/or arranging an adjustment mass that is distinct from the offshore wind turbine or component thereof into or in at least one dynamic behaviour adjustment position along the height of the vertical crane structure.

2. The crane vessel according to claim 1, wherein the vertical crane structure extends at least 50 meters or more above a deck of the vessel.

3. The crane vessel according to claim 1, wherein the roll behaviour adjustment system comprises a vertically mobile adjustment mass that is vertically mobile along the vertical crane structure and an associated mobile adjustment mass support system, the mobile mass support system being configured to raise or lower the adjustment mass along the crane structure, and to fix the adjustment mass in at least one dynamic behaviour adjustment position to thereby change the dynamic behaviour of the vessel.

4. The crane vessel according to claim 3, wherein the at least one dynamic behaviour adjustment position is in an upper halve of the vertical crane structure.

5. The crane vessel according to claim 3, wherein the mobile adjustment mass system comprises a guide fixed to the vertical crane structure for guiding the mobile adjustment mass when being moved into the at least one dynamic behaviour adjustment position.

6. The crane vessel according to claim 1, wherein the mobile adjustment mass is modular and the mass of the mobile mass can be reduced or increased depending on the adjustment required.

7. The crane vessel claim 1, wherein the adjustment mass comprises a volume chamber at a fixed dynamic behaviour adjustment position or a vertically mobile volume chamber that is vertically movable relative to the vertical crane structure, and a pump to fill the volume chamber with liquid.

8. The crane vessel according to claim 1, wherein the vertical crane structure is composed of a crane structure base that is fixed to the hull and a crane structure top section that is supported on the crane structure base via the slew bearing and forms the top, wherein the boom is mounted to the crane structure top section so as to revolve along with the crane structure top section.

9. The crane vessel according to claim 8, wherein the vertically mobile adjustment mass is vertically mobile inside the crane structure top section.

10. The crane vessel according to claim 1, wherein the boom is connected to the top of the vertical crane structure.

11. A method for hoisting of an offshore wind turbine or a component thereof, comprising the steps of:
of a using the crane vessel according to claim 1; and
wherein the dynamic behaviour adjustment system that is operated to adjust the dynamic behaviour of the vessel by moving and/or arranging an adjustment mass that is distinct from the offshore wind turbine or component thereof into or in at least one dynamic behaviour adjustment position along the height of the vertical crane structure.

12. A crane vessel for hoisting of an offshore wind turbine component comprising:
a hull having a deck;
a tower crane, the tower crane comprising:
a crane tower having a tower base mounted to the hull and a tower top; and
a crane unit, the crane unit comprising:
a revolving crane superstructure;
a boom, pivotally connected to the superstructure for pivoting about a horizontal pivot axis; and
a slew bearing, rotatable supporting the crane superstructure on the crane tower,
wherein the crane is provided with a dynamic behaviour adjustment system that is configured to adjust the dynamic behaviour of the vessel by moving and/or arranging an adjustment mass that is distinct from the offshore wind turbine or component thereof into or in at least one dynamic behaviour adjustment position along the height of the vertical crane structure.

13. The crane vessel according to claim 12, wherein the crane tower extends at least 50 meters or more above the deck of the vessel.

14. The crane vessel according to claim 12, wherein the tower crane comprises a nacelle balcony, supported by the tower, the balcony being configured for supporting the nacelle at a height above the deck, wherein the height allows for fixing one or more blades to the nacelle supported by the balcony.

15. The crane vessel according to claim 12, wherein the crane tower is a modular tower, and is composed out of multiple stackable tower sections for building or extending the crane tower, and wherein the tower crane comprises a lifting device for lifting the modular sections.

16. The crane vessel according to claim 12, wherein the tower crane comprises a stacking sleeve, configured for stacking a crane tower section on top of another crane tower section, and for lifting the crane over a height of at least one crane tower section.

17. The crane vessel according to claim 12, wherein the crane is an around the leg climbing crane, wherein the slew bearing has a central crane tower passage through which crane tower passage the crane tower extends, and wherein the crane comprises a crane lifting device, configured for lifting the crane up and down the crane tower.

18. The crane vessel according to claim 12, wherein the tower crane further comprises a roll damping system, wherein the roll damping system is located in the upper half of the tower, and wherein the roll damping system comprises a tuned mass damper.

* * * * *